(12) United States Patent
Yamamoto

(10) Patent No.: US 6,564,124 B2
(45) Date of Patent: May 13, 2003

(54) STEERING CONTROL DEVICE FOR RADIO-CONTROLLED MODEL HELICOPTER

(75) Inventor: Michio Yamamoto, Mobara (JP)

(73) Assignee: Futaba Corporation, Mobara (JP)

( * ) Notice: Subject to any disclaimer, the term of this patent is extended or adjusted under 35 U.S.C. 154(b) by 0 days.

(21) Appl. No.: 09/983,099

(22) Filed: Oct. 23, 2001

(65) Prior Publication Data

US 2002/0049518 A1 Apr. 25, 2002

(30) Foreign Application Priority Data

Oct. 23, 2000 (JP) ........................................ 2000-322597

(51) Int. Cl.[7] .............................. G05D 1/00; B64C 13/16
(52) U.S. Cl. ............................................ 701/2; 244/75 R
(58) Field of Search .............................. 701/1–4, 15–16, 701/120; 244/160–162, 164, 171, 17.11, 17.13, 17.15, 17.17, 26, 50, 75 R–76 R, 177–181, 183–186, 196–197, 220–222, 234–237, 90 R, 90 A, 96

(56) References Cited

U.S. PATENT DOCUMENTS

| | | | | |
|---|---|---|---|---|
| 4,376,979 A | * | 3/1983 | Fowler et al. | ............ 244/17.13 |
| 4,500,967 A | * | 2/1985 | Murphy et al. | ............. 244/178 |
| 5,094,406 A | * | 3/1992 | Shafer | ........................ 244/3.21 |
| 6,088,633 A | | 7/2000 | Yamamoto | |
| 6,227,482 B1 | | 5/2001 | Yamamoto | |

* cited by examiner

Primary Examiner—Thu Nguyen
(74) Attorney, Agent, or Firm—Oblon, Spivak, McClelland, Maier & Neustadt, P.C.

(57) ABSTRACT

A steering control device synchronizes the driving operations of swash plate control servomechanisms. In roll control, the control amount adjustment circuit separates and converts the roll control signal into a roll servo drive control amount and a collective pitch servo drive control amount. The offset correction circuit offset-corrects the converted control amounts and outputs a servo control signal converted into the roll servo control amount and a servo control signal converted into the collective pitch servo control amount. The adder receives the roll servo control signal and the collective pitch servo control signal and adds them with a pitch control signal and a collective pitch control signal. Thereafter, the synchronous circuit synchronizes the added signals. The roll servo control output, the pitch servo output, and the collective pitch output are respectively output to the servo mechanisms with the same timing.

4 Claims, 7 Drawing Sheets

STEERING CONTROL DEVICE FOR RADIO-CONTROLLED MODEL HELICOPTER

BACKGROUND OF THE INVENTION

The present invention relates to a device for controlling steering signals for a radio-controlled model helicopter.

Helicopters can make a flight by rotating the main rotor, with the wings (blades) thereof adjusted to a certain attack angle, thus producing a lift. The steering is performed to four-axis control directions including roll, pitch, collective pitch, and yaw. The roll axis, the pitch axis, the collective axis, and the yaw axis are controlled by adjusting the rotor pitch angle of the rotating plane of the main rotor of a helicopter. For this control, a swash plate, which is disposed coaxially on the rotating shaft of the main rotor and of which the three axes have the degree of freedom, is controlled by means of servomechanisms.

FIG. 5 shows the principle of the control (here, the main rotor is not shown). The forward and backward control, shown in FIG. 5(a), is called pitch control (often referred to as elevator control). The rightward and leftward control, shown in FIG. 5(b), is called roll control (referred to as aileron control). The ascent and descent control, shown in FIG. 5(c), is called collective pitch control. In flight, the helicopter can travel in a desired direction by combining the above-mentioned controls.

In order to fly the body forward (in the direction of the arrow A), shown in FIG. 5(a), the servomechanism (not shown) controls the swash plate 12 disposed coaxially on the rotating shaft 11 of the main rotor to tilt the body in the direction of the arrow (a). In order to advance the body backward, the swash plate 12 is tilt in the reverse direction. The swash plate 12 is tilted in the opposite direction to fly the body backward.

In order to fly the body leftward (in the direction of the arrow B), shown in FIG. 5(b), the servomechanism (not shown) controls the swash plate 12 to tilt the body in the direction of the arrow (b).

In order to fly the body upward (in the direction of the arrow C), shown in FIG. 5(c), the servomechanism (not shown) controls the swash plate 12 to tilt the body in the direction of the arrow (c).

In the conventional roll, pitch, and corrective pitch steering method for the model helicopter steering device, independent mechanisms control the swash plate. However, recently, the so-called swash mixing method where three steering elements are mixed to steer a helicopter has been broadly used.

FIG. 6 is a cross-sectional view illustrating the swash plate 12 called a 120° swash plate. FIG. 7 is a perspective view illustrating the swash plate 12 called a 120° swash plate.

The swash plate 12, which controls the main rotor (not shown), is formed of a lower plate 13a and an upper plate 13b. The plates 13a and 13b are tiltably mounted on the rotating shaft 11. The lower plate 13a can be vertically slid on the rotating shaft 11 of the main rotor 11a and does not depend on the rotation of the rotor 11. The upper plate 13b, which rotates in harmony with the rotating shaft 11, is mounted coaxially together with the rotating axis 11 and the lower plate 13a.

The main control rods 16a, 16b, 16c, and 16d are faced oppositely to and linked perpendicularly to each other on the circumference of the upper plate 13b. The other end of each rod extends to the main rotor 11a. The swash plate control rods 15a, 15b, and 15c are linked on the outer circumference of the lower plate 13a at intervals of 120°. The pitch servomechanism 14a, the collective pitch servomechanism 14b, and the roll servomechanism 14c are directly linked to the other ends of the swash plate control rods 15a, 15b, and 15c, respectively. Moreover, the control device is prepared that cooperatively operates the three servomechanisms in accordance with a collective pitch control amount and cooperatively operates the three servomechanisms in accordance with a roll control amount or pitch control amount. The control device selectively operates cooperatively the three servomechanisms through the electrical mixing process.

In the roll manipulation, for example, the right and left direction control of the body is performed as follows. That is, the collective pitch servomechanism 14b is moved by the same amount in the direction opposite to the moving direction of the roll servomechanism 14c. The swash plate control rods 15b and 15c are vertically moved to rotate on the axes (Y, Y) (FIG. 6) as center. Thus, the lower plate 13a and the upper plate 13b are tilted. By controlling the main control rods 16a to 16d, the pitch angle of a blade of the main rotor 11a is changed.

In the pitch manipulation, the operation amount is controlled to ½ in the direction opposite to the movement of the pitch servomechanism 14a to operate the roll servomechanism 14c and the collective pitch servomechanism 14b. The swash plate control rods 15a to 15c are vertically moved to rotate on the axes (X, X) (FIG. 6) as center. Thus, the lower plate 13a and the upper plate 13b are tilted and the main control rods 16a to 16d are controlled. The pitch angle of the blade of the main rotor 11a is changed so that the forward and backward movements of the body are controlled.

In the collective pitch manipulation, all the three servomechanisms 14a to 14c are controlled in a similar manner to operate vertically. Thus, the swash plate control rods 15a to 15c are traveled vertically by the same amount. The lower plate 13a and the upper plate 13b are vertically moved in parallel on the circumference of the driving shaft 11, with the plates 13a and 13b maintained to the original tilt. Thus, when the main control rods 16a to 16d move vertically, the pitch angle of the blade of the main rotor 11a changes. As a result, the upward and downward movement of the body is controlled. 11a is controlled in accordance with the collective pitch control amount. In the roll control, the right and left tilt angles of the main rotor are changed in accordance with the roll control amount. In the pitch control, the front and back tilt angles of the main rotor are changed in accordance with the pitch control amount.

As described above, the plural mixing manipulations allow the swash plate 12 to be controlled.

The direct swash control has the advantage in which the looseness is small because the mechanism is simple and the mechanical linkage allows direct connection to the servo-mechanism.

However, the direct swash control requires that two or more servomechanisms operate for each axis manipulation. This complicates the control method. The following problems to be solved occur to subject the operation of the servomechanism to the mixing control.

Firstly, since the servo control signals transmitted from the transmitter is converted into a serial pulse sequence, time shifts occur when the servo control signals respectively reach the servomechanisms at the body of a helicopter. This causes a response difference in the servo operation for each axis, thus resulting in an axial interference.

Secondary, when there is a difference between servo operation velocities of the axes, the axial interference occurs in manipulation.

Thirdly, in the pitch control, the roll servomechanism and the collective pitch servomechanism can move by ½ of the moving angle of the pitch servomechanism. This operation causes the time difference between servo operations, thus resulting in an axial interference.

Finally, the servomechanism generally moves circularly to implement the control operation. For control, pivots, arranged in a disk pattern, are linked to the pivots of the swash plate. The collective pitch manipulation causes three servomechanisms to move at the same time, thus offsetting the pivot points. If the roll or pitch manipulation is carried out at the offset point, a difference occurs between the movement of the swash plate in the ascent direction and the movement of the swash plate in the descent direction. As a result, an axial interference occurs in the collective pitch direction.

SUMMARY OF THE INVENTION

The present invention is made to solve the above-mentioned problems.

Moreover, the objective of the invention is to provide a steering control device that corrects each servo control signal to minimize the other axis interference produced mechanically by the direct swash controller.

The objective of the present invention is achieved by a steering control device suitable for a radio-controlled model helicopter, comprising a receiver for receiving three steering signals serially transmitted from a transmitter and demodulating, and then outputting three servo control signals, the three steering signals including a roll steering signal, a pitch steering signal, and a collective pitch steering signal, the three servo control signals including a roll servo control signal, a pitch servo control signal, and a collective pitch servo control signal; a controller for mixing as manipulation signals for three axes the three servo control signals output from the receiver and then outputting three servo drive signals for three axes, the three servo drive signals including a roll servo drive signal, a pitch servo drive signal and a collective pitch servo drive signal; a synchronous circuit for synchronizing the three servo drive signals output from the controller and outputting the three servo drive signals in parallel; and a roll servo mechanism, a pitch servo mechanism, and a collective pitch servo mechanism, which are controllably driven respectively by the three servo drive signals.

The steering control device further comprises control amount adjustment computation circuits for computing the three servo control signals respectively as three control amounts for the three axes. The steering control device further comprises time constant circuits for respectively adjusting the operation times of the three servo mechanisms in accordance with said steering signals for three axes from the control amount adjustment computation circuits, which respectively receives the pitch servo control signal. The steering control device further comprises offset correction circuits for respectively correcting offset amounts at servo positions of the three servo mechanisms, in accordance with three steering signals for three axes from the control amount adjustment computation circuits, which respectively receives a roll servo control signal and a pitch servo control signal.

BRIEF DESCRIPTION OF THE DRAWINGS

This and other objects, features, and advantages of the present invention will become more apparent upon a reading of the following detailed description and drawings, in which.

BRIEF DESCRIPTION OF THE PREFERRED EMBODIMENTS

An embodiment of the present invention will be described below with reference to the attached drawings.

Figure 1:
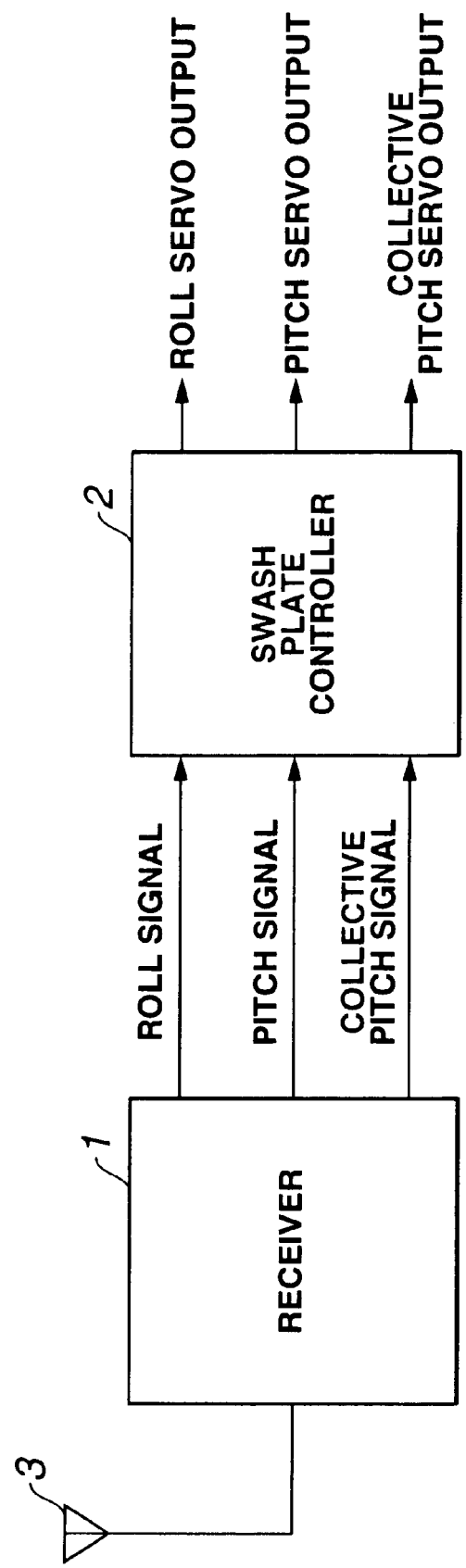
FIG. 1 is a block diagram schematically illustrating a receiver according to an embodiment of the present invention.
Figure 2:
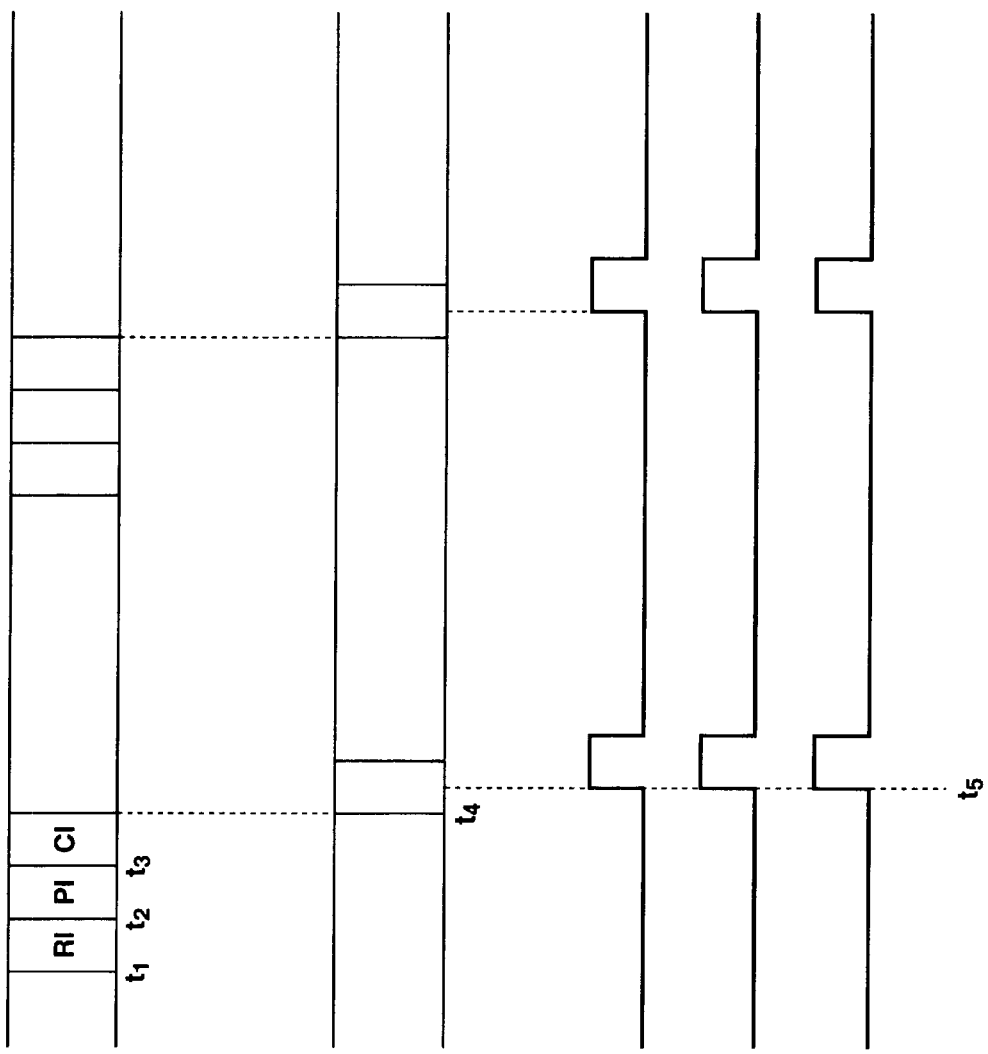
FIG. 2 is a timing chart of control signals.
Figure 3:
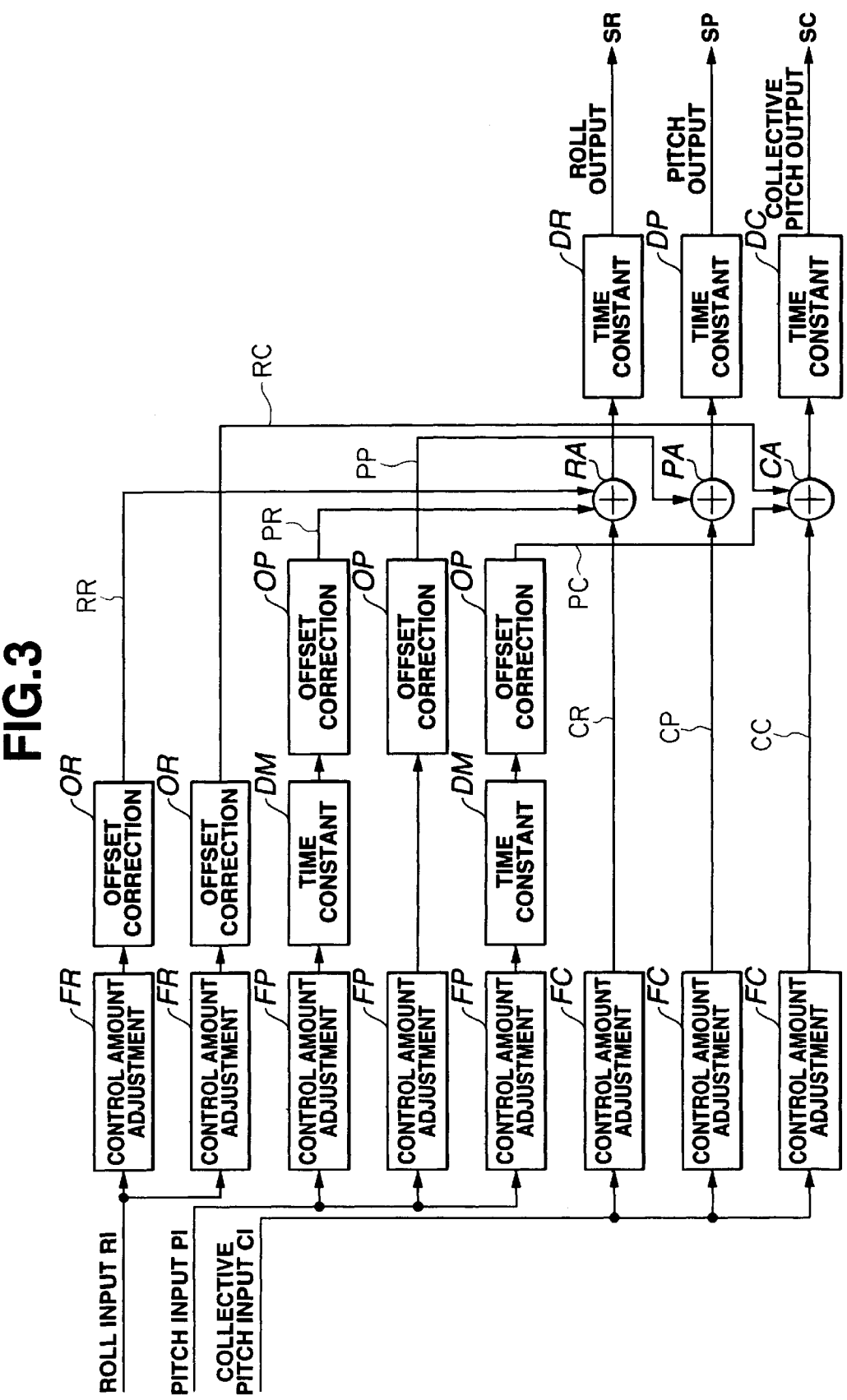
FIG. 3 is a block diagram schematically illustrating the process procedure of the mixing circuit in a swash plate controller, according to the present invention.
Figure 6:
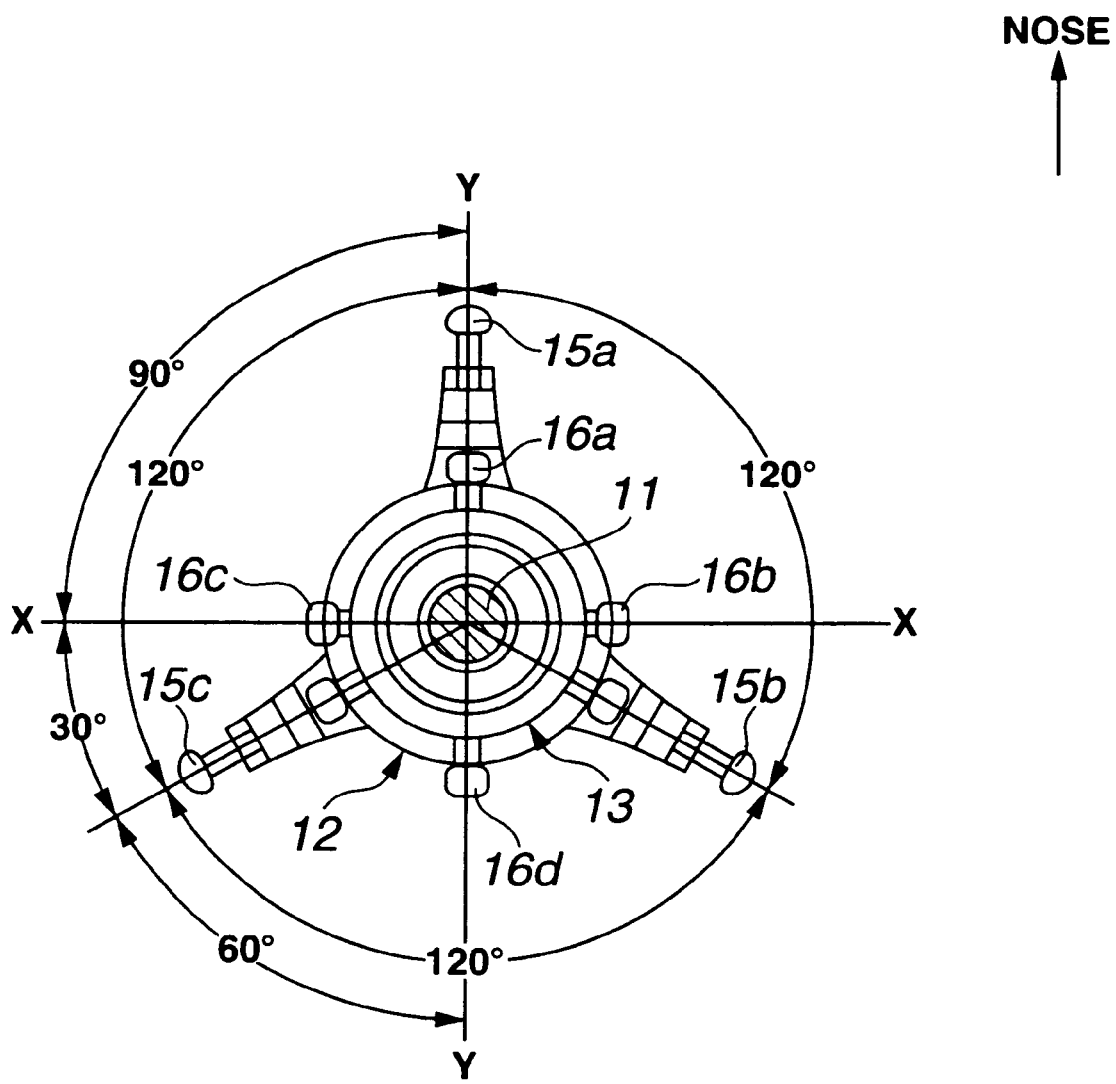
FIG. 6 is a plan view illustrating a swash plate for a model helicopter.

An embodiment of the present invention is shown in FIGS. 1, 2 and 3. FIG. 1 shows an example of the configuration of an embodiment of the present invention. FIG. 2 is a timing chart of respective signals controlled by the receiver 2. FIG. 3 is a block diagram showing a control procedure of three steering signals transmitted from a transmitter. The swash plate and the servomechanisms of the present invention are identical to those shown FIGS. 6 and 7.

The steering control device for a radio-controlled model helicopter shown in FIG. 1 consists of a receiver 1, a swash plate controller 2, and a receiving antenna 3. The swash plate controller 2, which employs the direct swash control system, is disposed at the rear stage of the receiver 1 in a model helicopter.

At the transmitter (not shown), three steering signals, including a roll steering signal, a pitch steering signal, and a collective pitch steering signal, transmitted from the transmitter to control the swash plate are serially transmitted as independent control signals for the axes, without the mixing manipulation.

As shown in FIG. 2, the receiver 1 receives a steering signal, a roll steering signal, a pitch steering signal, and a collective pitch steering signal for each axis, transmitted from the transmitter, with the timings t1, t2, and t3 (refer to FIG. 2(a)) and demodulates them. Then, the receiver 1 outputs the demodulated signals to the direct swash controller 2. The direct swash controller 2 synchronizes the demodulate signals as three servo drive signals and then outputs them in parallel with the timing t4 (FIG. 2(b)).

The direct swash controller 2 receives three servo control signals: the roll signal RI, the pitch signal PI, and the collective pitch signal CI. After reception of the servo control signals for three axes, the controller 2 performs various mixing operations. Thus, the controller 2 actually creates and outputs servo drive signals for each axis, that is, the roll servo drive signal SR, the pitch servo drive signal SP, and the collective pitch servo drive signal SC. The controller 2 outputs all the servo drive signals for three axes at the same time (with the timing t5) in a synchronous mode. This operation removes a variation in response characteristic due to a time difference between the servo drive signals.

In the roll control, the right and left tilt angles of the main rotor changes in accordance with the roll control amount. In the pitch control, the front and rear tilt angles of the main rotor changes in accordance with the pitch control amount. In the corrective pitch control, the blade pitch of the main rotor is controlled in accordance with the collective pitch control amount.

FIG. 3 shows the detail of the mixing control controlled by the controller within the swash plate controller 2. FIG. 3 is a block diagram illustrating the computation procedures of various operation circuits within the swash plate controller 2. The swash plate controller 2 receives the roll input signal RI, transmitted from the transmitter side, and then outputs it as the roll servo drive signal SR for three axes. The swash plate controller 2 receives the pitch input signal PI, transmitted from the transmitter side, and then outputs it as the pitch servo drive signal SP. Moreover, the swash plate controller 2 receives the collective pitch input signal CI, transmitted from the transmitter side, and then outputs it as the collective pitch servo drive signal SC. The three steering control signals produced from the transmitter are respectively transmitted as control signals for the three axes, without any mixing operation.

In the mixing control for the 120° swash plate, the steering control is performed by respectively converting the control amounts of the roll steering signal, the pitch steering signal, and the collective pitch steering signal into control amounts for three servo mechanisms. Hence, an actual control amount for each of the three servomechanisms is obtained by subjecting the steering signal acting as a servo control signal to mixing.

Figure 7:
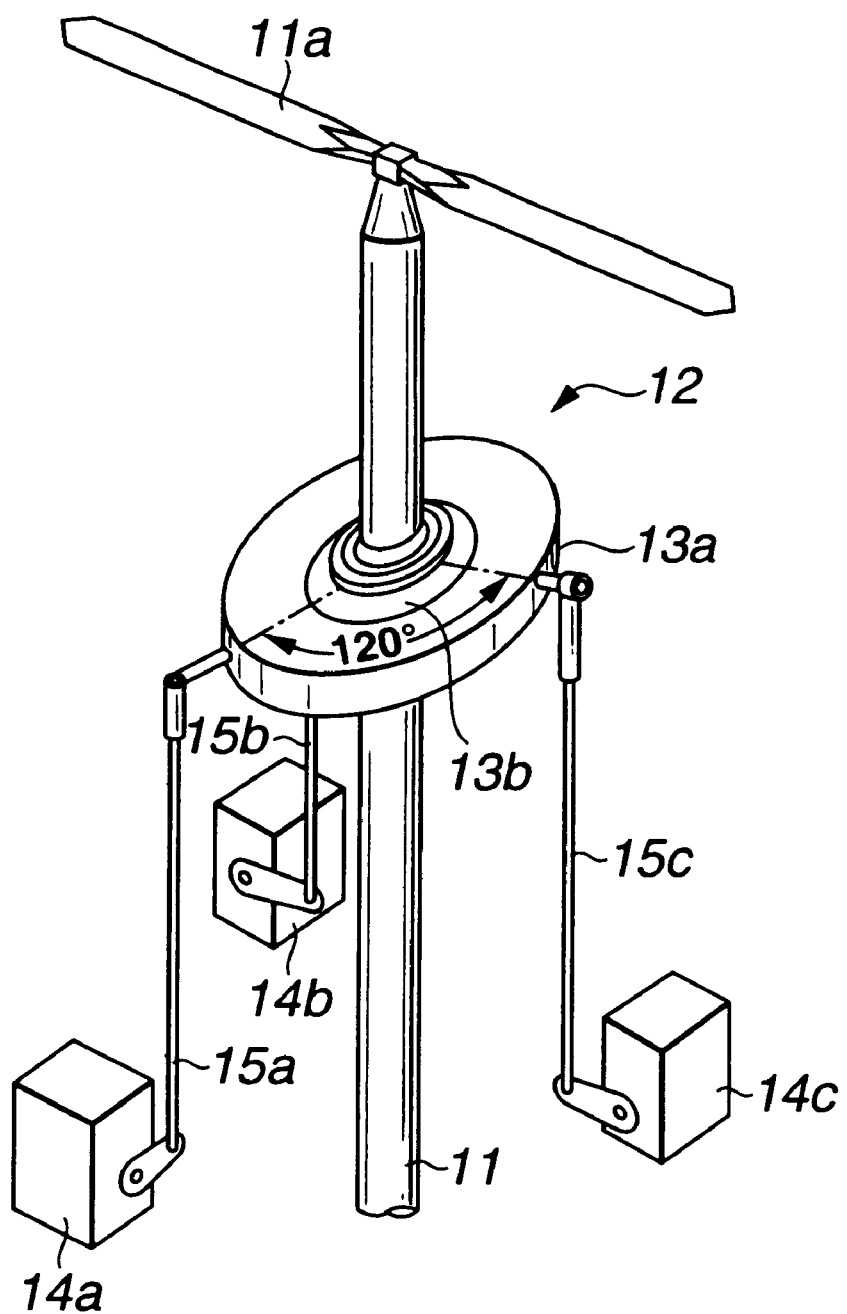
FIG. 7 is a perspective view showing a swash plate, which controls the steering of a model helicopter, and servomechanisms.

The computation under the mixing control of each control signal carried out by the control circuit in the swash plate controller 2 will be described below by referring to FIGS. 3 and 7.

In the roll control, the receiver 1 receives the roll steering signal, which is formed by manipulating a roll stick of the transmitter (not shown), and then demodulates it. The swash plate controller 2 receives the demodulated signal as a roll servo control signal. The mixing circuit in the controller 2 creates a servo drive signal to move the roll servomechanism 14c and the collective pitch servomechanism 14b at the same time and by the same amount relatively in an opposite direction.

The control amount adjustment circuit FR separates and converts the roll servo control signal RI input to the swash plate controller 2 into the drive control amount of the roll servomechanism 14c and the drive control amount of the collective pitch servo controller 14b. The offset correction circuit OR offset-corrects the drive control amounts and outputs the servo manipulation signal converted into the roll servo control amount RR and the servo manipulation signal converted into the collective pitch servo control amount RC. The roll servo manipulation signal is sent to roll servo control signal adder RA. The collective pitch servo manipulation signal is sent to collective pitch servo control signal adder CA. In the roll control, the pitch control amount becomes zero.

As apparent from the above-mentioned description, the mixing circuit within the swash plate controller 2 computes the roll input signal RI in accordance with the following formulas.

Roll servo control amount $(RR)=+(RI \times \cos 30°) \times FR \times OR$

Pitch servo control amount $(RP)=0$

Collective pitch servo control amount $(RC)=-(RI \times \cos 30°) \times FR \times OR$ where + represents that a swash plate is tilted upward; − represents that a swash plate is tilted downward; FR represents a function rate and is a coefficient for separating and converting a roll control amount into a roll servo control and a collective pitch servo control; and OR represents a coefficient for offset correction (to be described in detail later).

In the pitch control, the receiver 1 receives the pitch steering signal created by moving the roll stick on the transmitter (not shown) and demodulates it. The mixing circuit within the swash controller 2 receives the demodulated signal and creates the servo manipulation signal which moves the pitch servomechanism 14a, the roll servomechanism 14c, and the collective pitch servomechanism 14b, at the same time and relatively to the opposite direction. Each of the roll servomechanism 14c and the collective pitch servomechanism 14b has the same control amount, which is half of the control amount of the pitch servomechanism 14a.

The pitch servo control signal PI is input to the swash plate controller 2. The control amount adjustment circuit FP separates and converts the pitch servo control signal into the drive control amount of the roll servomechanism 14c, the drive control amount of the pitch servomechanism 14a, and the drive control amount of the collective pitch servo controller 14c. Moreover, in the pitch control, the time constant correction circuit DM compensates the operation time to the roll servomechanism and the collective pitch servomechanism. The reason is that the operation time of the pitch servomechanism 14a differs from the drive operation time of each of the roll servomechanism 14c and the collective pitch servo controller 14b.

The offset correction circuit OP offset-corrects the drive control amount and produces the servo manipulation signal converted into the roll servo control amount PR and the servo manipulation signal converted into the collective pitch servo control amount PC. The roll servo manipulation signal is sent to the roll servo control signal adder RA. The pitch servo manipulation signal is sent to the pitch servo control signal adder PA. The collective pitch servo manipulation signal is sent to the collective pitch servo control signal adder CA.

As apparent from the above description, the mixing circuit in the swash plate controller 2 computes the pitch input signal PI in accordance with the following formulas.

Roll servo control amount $(PR)=-(PI \times \cos 60°) \times FP \times DM \times OP$ Pitch servo control amount $(PP)=+PI \times FP \times OP$ Collective pitch control amount $(PC)=-(PI \times \cos 60°) \times FP \times DM \times OP$ where + represents that a swash plate is tilted upward; − represents that a swash plate is tilted downward; FP represents a function rate and is a coefficient for separating and converting a pitch control amount into a roll servo control, a pitch servo control, and a collective pitch servo control; DM represents a time constant for correcting a servo operation time; and OR represents a coefficient for offset correction (to be described in detail later).

In the collective pitch control, the mixing circuit in the swash plate controller 2 creates a servo manipulation signal which vertically moves three servomechanisms 14a, 14b, and 14c by the same value, with the three servomechanisms horizontally maintained, based on the collective pitch control amount. The collective pitch control amount is created through manipulating the collective pitch stick of the transmitter (not shown).

The roll servo control amount CR, the pitch control amount CP, and the collective pitch control amount CC have the same value. These control amounts are respectively transmitted, as a servo control signal, to the roll servo control signal adder RA, the pitch servo control signal adder PA, and the collective pitch servo control signal adder CA.

The mixing circuit in the swash plate controller 2 computes the collective pitch input signal CI in accordance with the following formulas.

Roll servo control amount $(CR)=+CI \times FC$

Pitch servo control amount $(CP)=+CI \times FC$

Collective pitch servo control amount $(CC)=+CI \times FC$ where FC represents a function rate.

Figure 4A:
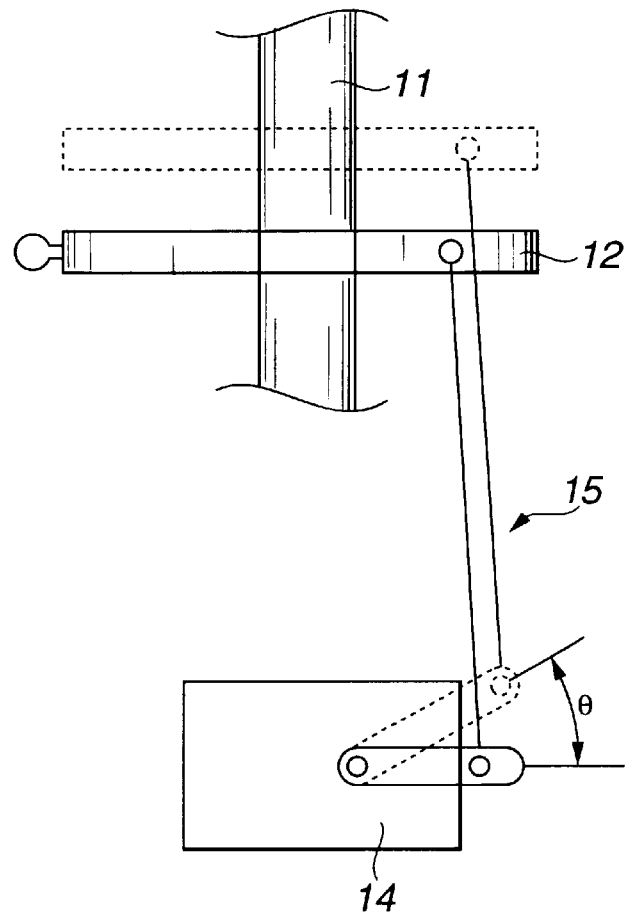
FIG. 4 is a conceptual diagram showing the principle of the offset correction of servomechanism, according to the present invention.
Figure 4B:
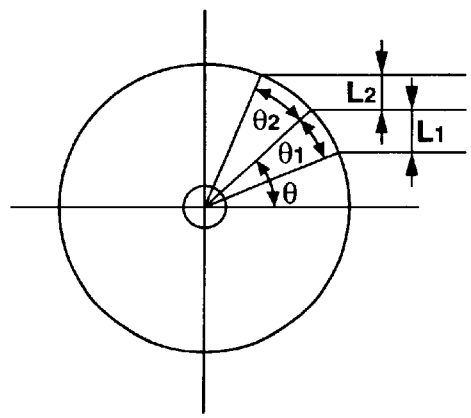
Figure 5A:
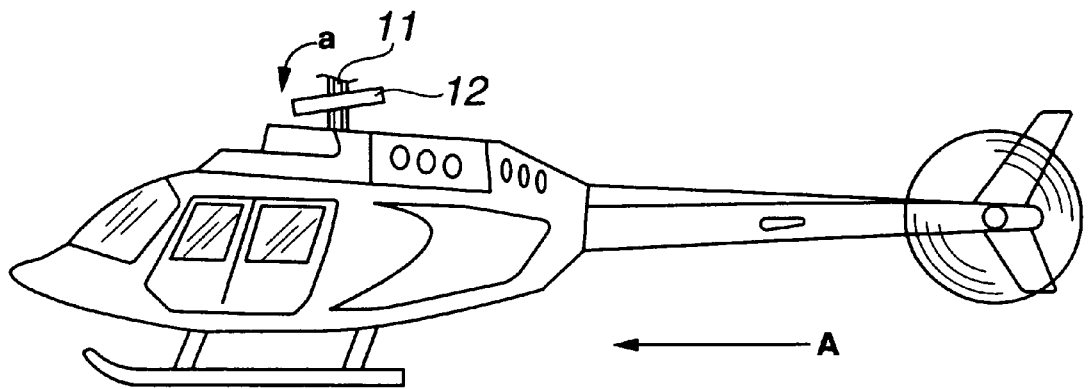
FIG. 5 is an explanatory diagram showing the principle of steering a model helicopter.
Figure 5B:
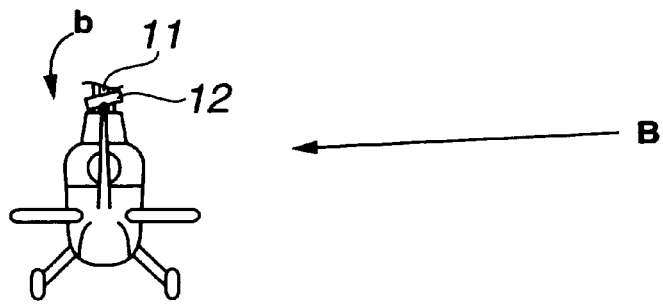
Figure 5C:
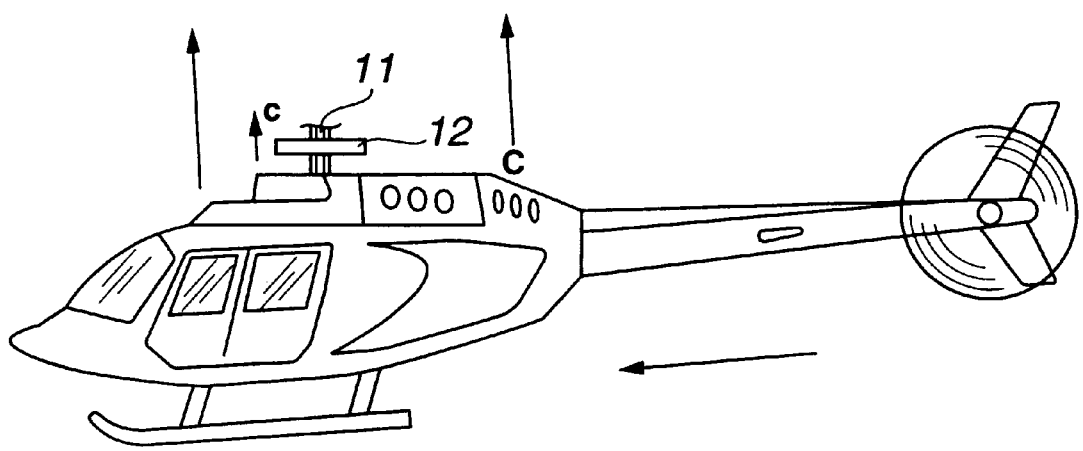

FIG. 4 is a conceptual diagram showing the principle of the servo offset correction. The swash plate is manipulated by converting the circular movement of a servomechanism into a straight movement. When the pivot of the servomechanism is positioned perpendicular to the link, the differential action does not occur. However, when the collective pitch servo drive is carried out in the roll and pitch manipulation, the pitch manipulation reference point becomes offset so that the differential action occurs in the straight movement.

In the roll manipulation, let us now assume that the offset angle is $\theta$, the operation angle of the roll servomechanism is $\theta1$, the operation angle of the collective pitch servomechanism is $\theta2$, the straight movement amount of the roll servomechanism is L1, and the straight movement amount of the corrective pitch servomechanism is L2. In this case, the following relationships are held.

$L1 = \sin\theta - \sin(\theta - \theta1)$ $L2 = \sin(\theta2 + \theta) - \sin\theta$ When the roll servomechanism moves by $\theta1$, it is required that $\theta2 = \sin_{-1}(2 \sin\theta - \sin(\theta - \theta1))$ to make the straight movement to the same amount, that is, L1=L2. For that reason, a value satisfying the above formulas is selected as the offset correction value OR. Similarly, a correction value is set for the pitch collection value OP.

The inverse trigonometric function in the formula may be actually solved. However, such a method takes much time for calculation. Instead, a table listing offset correction values (OR, OP) to $\theta$ and $\theta1$ is previously prepared. Correction values are read out from the table.

Each of the roll servo control signal adder RA, the pitch servo control signal adder PA, and the collective pitch servo control signal adder CA produces the axis output signal as a logical sum of the three factors. Each of the synchronous circuit DR, DP and DC corrects a difference in operational speed of a corresponding servomechanism. The synchronous circuits DR, DP, and DC subjects the servo manipulation output signals, SR, SP, and SC to synchronization and then outputs them at the same time.

The servo manipulation output signals SR, SP, and SC are output in accordance with the following formulas.

Roll servo operation amount $SR=(RR+PR+CR) \times DR$

Pitch servo operation amount $SP=(RP+PP+CP) \times DP$

Collective pitch operation amount $SC=(RC+PC+CC) \times DC$ where DR is a time constant correcting an operation speed difference of the roll servomechanism; DP is a time constant correcting an operation speed difference of the pitch servomechanism; and DC is a time constant correcting an operation speed difference of the collective pitch servomechanism.

In this embodiment, a 120°-type swash plate has been explained above. However, different type swash plates may be used through adjusting the control amount.

According to the present invention, since the servo control signals for the roll axis, the pitch axis, and the collective pitch axis are synchronized, interference to other axis can be minimized.

Since the amount of an operation signal for each axis factor can be adjusted, mechanical variations of the swash plate and variations of the servo operation amount can be easily corrected.

Moreover, the axial interference, which is caused by the operation time difference due to the difference between the pitch-servomechanism operation amount, the roll-servomechanism operation amount, and the collective-pitch-servomechanism operation amount, generated in the pitch manipulation, can be adjusted.

Since the offset caused by the collective pitch manipulation is corrected, the interference to other axis due to an offset can be minimized.

What is claimed is:

1. A steering control device suitable for a radio-controlled model helicopter, comprising:

a receiver for receiving three steering signals serially transmitted from a transmitter and demodulating the signals, and then outputting three servo control signals, said three steering signals including a roll steering signal, a pitch steering signal, and a collective pitch steering signal, said three servo control signals including a roll servo control signal, a pitch servo control signal, and a collective pitch servo control signal;

a controller for mixing as manipulation signals for three axes of rotation, said three servo control signals output from said receiver and then outputting three servo drive signals for the three axes of rotation, said three servo drive signals including a roll servo drive signal, a pitch servo drive signal and a collective pitch servo drive signal;

a synchronous circuit for synchronizing said three servo drive signals output from said controller and outputting said three servo drive signals in parallel; and a roll servo mechanism, a pitch servo mechanism, and a collective pitch servo mechanism, which are controllably driven respectively by said three servo drive signals.

2. The steering control device defined in claim 1, further comprising control amount adjustment computation circuits for computing said three servo control signals respectively as three control amounts for said three axes of rotation.

3. The steering control device defined in claim 1, further comprising time constant circuits, which respectively receive said pitch servo control signal, for respectively adjusting the operation times of said three servo mechanisms in accordance with said steering signals for three axes of rotation from control amount adjustment computation circuits.

4. The steering control device defined in claim 1, further comprising offset correction circuits, which respectively receive a roll servo control signal and a pitch servo control signal, for respectively correcting offset amounts at servo positions of said three servo mechanisms, in accordance with three steering signals for three axes of rotation from control amount adjustment computation circuits.

* * * * *